(12) United States Patent
Fanguy

(10) Patent No.: US 7,198,659 B1
(45) Date of Patent: Apr. 3, 2007

(54) GAS BUSTER EXHAUST STACK LIQUID CONTAINMENT APPARATUS AND METHOD

(76) Inventor: Robert Paul Fanguy, 3507 Captain Cade Rd., Broussard, LA (US) 70518

( * ) Notice: Subject to any disclaimer, the term of this patent is extended or adjusted under 35 U.S.C. 154(b) by 244 days.

(21) Appl. No.: 10/830,757

(22) Filed: Apr. 23, 2004

(51) Int. Cl.
*B01D 19/00* (2006.01)
(52) U.S. Cl. .............................. 95/267; 96/189; 96/409; 55/342; 55/385.1; 55/434
(58) Field of Classification Search ................. 96/188, 96/189, 190, 409; 95/267; 55/342, 385.1, 55/385.5, 434
See application file for complete search history.

(56) References Cited

U.S. PATENT DOCUMENTS

| 1,916,065 | A | * | 6/1933 | Mount et al. ................. 96/183 |
| 4,593,714 | A | | 6/1986 | Madden |
| 4,842,443 | A | | 6/1989 | Argandona |
| 5,829,964 | A | | 11/1998 | Derrick et al. |
| 6,793,814 | B2 | * | 9/2004 | Fout et al. ................... 210/188 |

* cited by examiner

*Primary Examiner*—Robert A. Hopkins
(74) *Attorney, Agent, or Firm*—Robert N. Montgomery

(57) ABSTRACT

A containment apparatus for collecting liquids including oil and water emitted from a gas buster exhaust stack. The containment includes baffling and a liquid float and discharge line for returning the liquids to a reservoir. Multiple containments may be connected to contain potentially greater discharges.

11 Claims, 3 Drawing Sheets

GAS BUSTER EXHAUST STACK LIQUID CONTAINMENT APPARATUS AND METHOD

FIELD OF THE INVENTION

This invention relates generally to gas buster or liquid/gas separation units used in oil and gas well drilling and restoration operations and more particularly to a liquid containment chamber attachable to the exhaust stack of the gas buster units for the prevention of spills and environmental contamination due to liquid laden gas discharge and high pressure gas kicks.

GENERAL BACKGROUND

A gas buster is a simple separator vessel used to remove free or entrained gas from fluids circulated in the well bore, such as mud used during drilling operations. The gas buster typically comprises a vessel containing a series of baffles with a liquid exit on the bottom and a gas-vent line at the top of the vessel.

A buster also separates gas from mud, but it is not a sealed unit and, therefore, does not permit the pressure of the gas to increase sufficiently to enable venting to any appreciable degree. A gas buster generally vents exhaust gas immediately above the well through an eight feet vent pipe.

Separators on the other hand are used on less than five percent of all wells and only after the casings have been inserted in a well in anticipation of hitting a large quantity of gas. Gas busters are used more extensively than separators, primarily because busters are less expensive and can be constructed quickly to meet emergency situations.

It is now required that a mud-gas separator (gas buster) must be installed and operable for all operations of 10M or greater and for any operation where abnormal pressure is anticipated beginning at a point at least 500 feet above any anticipated hydrocarbon zone of interest.

During drilling mud is circulated in the borehole and the entrained gases, which can be flammable, are separated in a liquid/gas separator, also commonly referred to in the industry as a gas buster. The separated gases, also commonly specified in the industry as waste gases, exit the top of the gas buster. In some cases the gases are directed down a long pipe, which is oriented down-wind from the rig floor. This pipe is generally about 100 feet long or more and contains an ignition source at its tip. Any flammable gases, which are released from the gas buster, are burned at the tip of the flare line where the ignition source is mounted. This has been a standard set-up for drilling rigs for many, many years.

In work-over operations mud separation coming from the well bore is achieved by mounting the gas buster directly on or adjacent to a mud tank in which case mud is ejected from the bottom of the gas buster into the mud tank for recovery and the waste gas is simply vented to atmosphere rather than ignited and burned.

Virtually all live wells produce a slightly oily mist from the gas buster stack. In most cases this light liquid simply dribbles down the stack and evaporates or is collected by the mud tank. However, high winds tend to carry this oily discharge a considerable distance down-wind from the stack thereby contaminating the environment. When such operations are being carried out over water this discharge presents an even greater problem. In most cases personnel fail to report such light contamination therefore it is simply ignored.

An isolated pocket of natural gas is known as a kick if it is under control and as a blowout if it is not under control. Such kicks occur frequently thereby forcing slugs of oil out of the well at high pressure and at such a velocity that the gas buster is overwhelmed thus forcing liquids out the stack. When this happens it is considered a major spill and it cannot be ignored. High winds also contribute to the spill by taking the oily discharge great distances from the well site or into water causing extensive environmental contamination that requires expensive clean up.

SUMMARY OF THE INVENTION

A containment apparatus for collecting liquids including oil and water emitted from a gas buster exhaust stack. The containment includes baffling and a liquid float and discharge line for returning the liquids to a reservoir. Multiple containments may be connected to contain potentially greater discharges.

BRIEF DESCRIPTION OF THE DRAWING

For a further understanding of the nature and objects of the present invention, reference should be made to the following detailed description taken in conjunction with the accompanying drawings, in which, like parts are given like reference numerals, and wherein.

DETAILED DESCRIPTION OF THE PREFERRED EMBODIMENT

Figure 1:
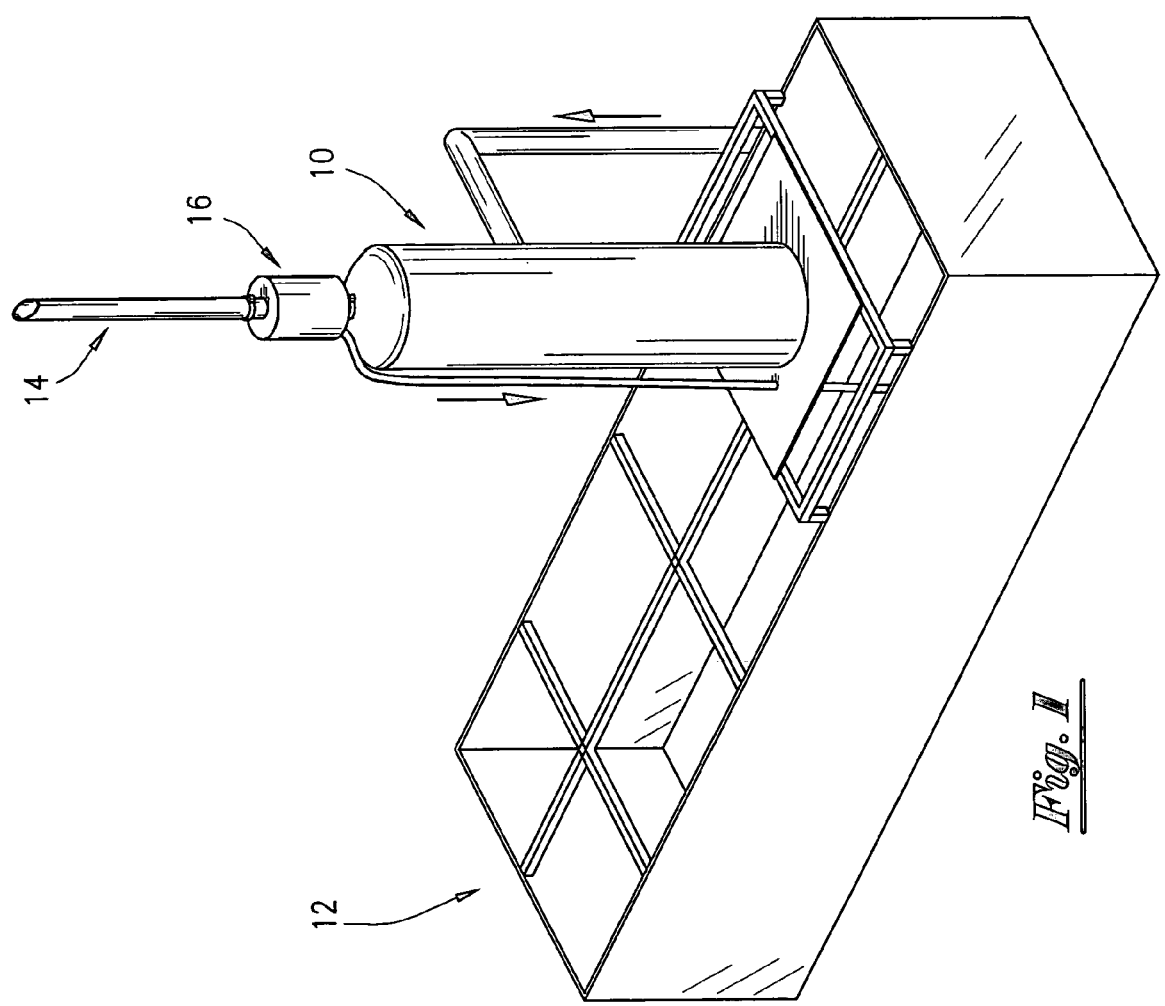
FIG. 1 is an isometric view of the liquid containment assembly in combination with a gas buster and its mud tank.

As first seen in FIG. 1 gas buster assemblies 10 are generally mounted above or adjacent to a mud tank 12. The gas buster 10 or liquid/gas separator is usually fitted with a length of pipe or stack 14 extending upwardly there from for the purpose of discharging waste gases being conveyed to the surface of a well with the drilling mud.

Under normal circumstances, the waste gas vapors contain small amounts of oil residue that are gradually dissipated downwind as they cool. However, on occasion kicks or surges occur as a result of gas pockets being trapped within the mud fluid stream. Such kicks often are at high pressure and thus overwhelm the gas buster 10 and force fluid out the stack 14. Such discharge causes considerable environmental problems and extensive clean up. Therefore, as a preventative measure a surge suppressor may be used in the form of a liquid containment assembly 16 connected to the top of the gas buster outlet before connecting the exhaust stack 14.

Figure 2:
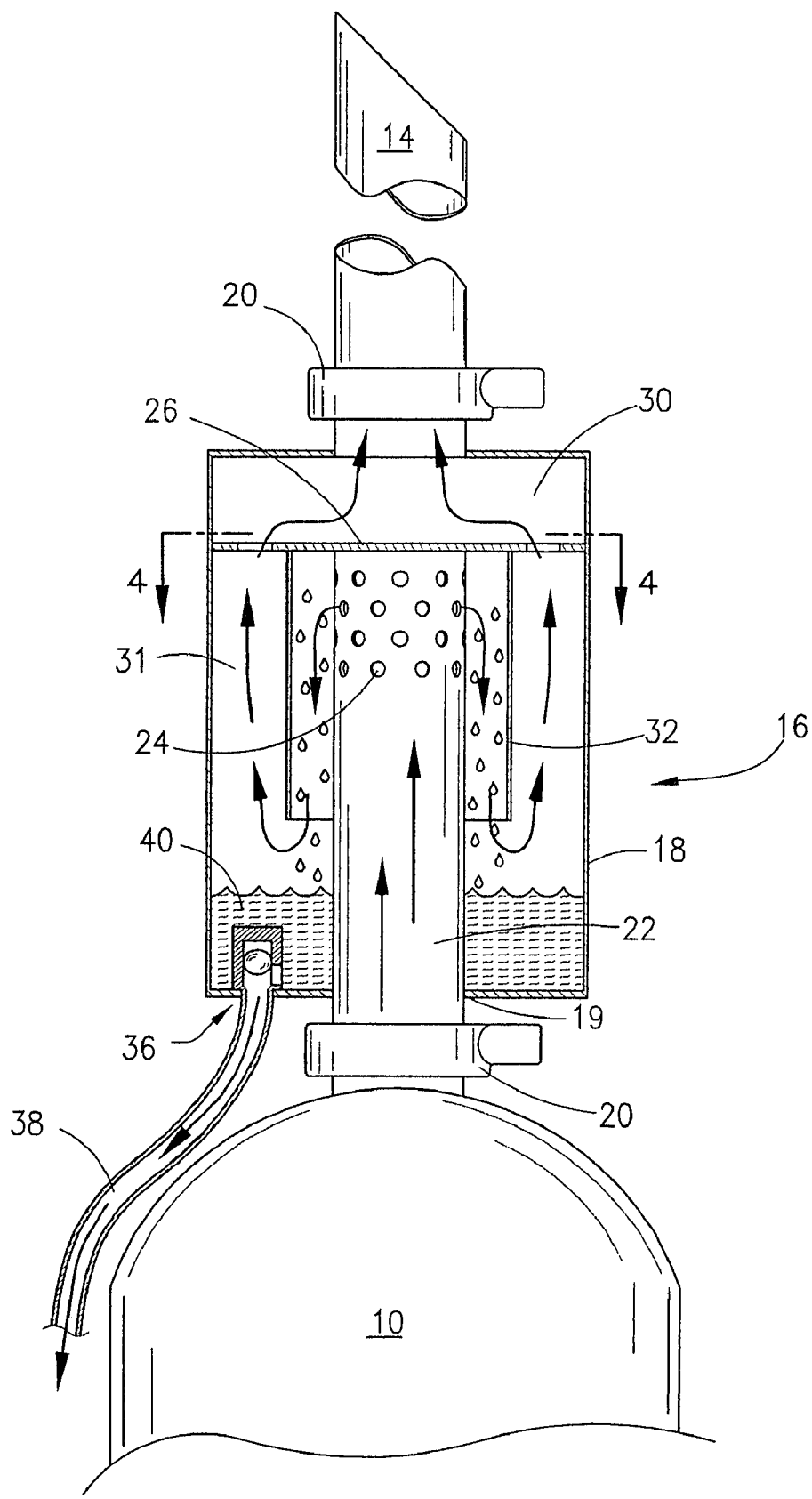
FIG. 2 is a partial vertical cross section view of the stack, containment and gas buster assembly.

The containment assembly 16 as shown in FIG. 2 is composed of an elongated cylindrical hollow housing 18. The housing 18 is fitted with an exhaust port at one end threadably adapted for connection to an exhaust stack member 14 by a hammerlock, union coupling member 20 or other suitable means. The opposite end of the housing 18 has an inlet opening 19 for receiving a portion of a tubular member 22. The housing 18 further includes an internal, baffle plate 26 having a plurality of holes 28 therein defining an outlet exhaust chamber 30, and a liquid chamber 31. The liquid chamber 31 includes a cylindrical baffle 32 attached perpendicularly to the baffle plate 26.

The tubular member 22, including a series of holes 24 located circumferentially around one end with a threaded portion for coupling at the opposite end, is inserted within the housing 18. The tubular member 22 is centrally located relative to the cylindrical baffle 32 and is secured in a liquid tight manner peripherally around the opening 19 in the manner seen in FIG. 2 so that the threaded portion extends beyond the housing 18 thus forming the inlet port.

A ball float valve assembly 36 penetrates the lower end of the housing 18 adjacent the tubular member 22. A drain tube 38 is attached to the said float valve 36.

Figure 3:
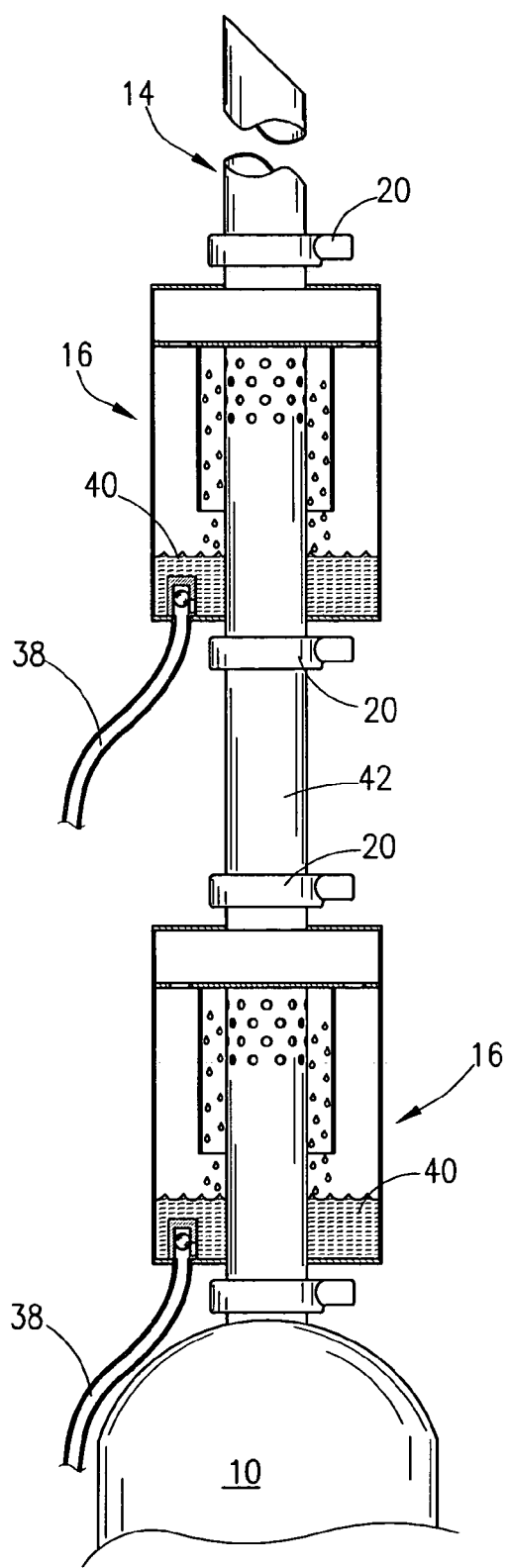
FIG. 3 is a partial vertical section view of a second embodiment utilizing plural containments.
Figure 4:
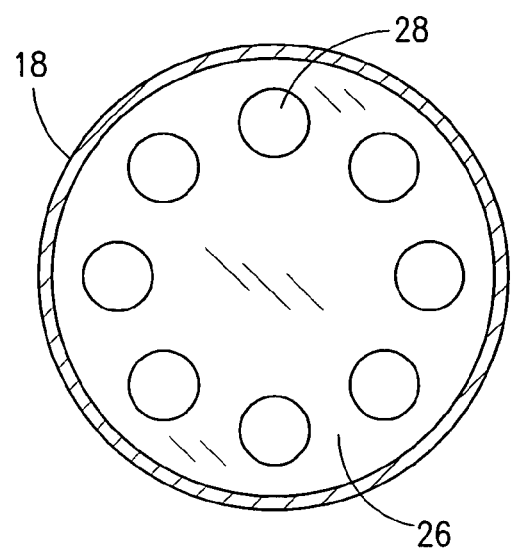
FIG. 4 is a top view of the baffle plate seen in cross section in FIGS. 2 and 3.

As shown in FIG. 3 multiple liquid containment assemblies 16 may be stacked one above the other by providing an intermediate or adapter stack 42 composed of a length of tubing threaded at each end for connection by hammerlock, union couplings 20.

In operation, exhaust gas entering the gas buster assembly 10 is entrained within the drilling fluid. When such gas/fluid exceeds the capacity of the gas buster assembly it is expelled upwards into the containment assembly 16 through the tubular member 22 and forced though the holes 24 and allowed to pass below the cylindrical baffle 32 and escape through the holes 28 in the baffle plate 26 and ultimately out the exhaust stack 14.

Fluids 40 are separated from the gas by the baffles and accumulated within the lower chamber 31. As the fluid level rises the ball valve 36 opens allowing the fluid to return to the mud tank 12 as seen in FIG. 1.

In some cases the volume of fluids entering the gas buster assembly 10 is simply too great for one containment assembly 16 alone to control the overflow. Therefore, any number of containment assemblies 16 may be added to the exhaust stack as shown in FIG. 3 thereby allowing the fluids to cool and condense and be returned to the tank 12.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A surge suppressor for a gas buster exhaust system comprising:
    a) a gas buster system comprising a mud recovery tank and a gas/oil separator said gas/oil separator having a gas discharge stack;
    b) at least one surge suppressor apparatus attached to said gas discharge stack; and
    c) a means for returning fluids collected within said surge suppressor to said mud recovery tank.

2. The surge suppressor for a gas buster exhaust system according to claim 1 wherein said surge suppressor apparatus comprises:
    a) an elongated tubular housing closed at each end having internal baffling said tubular housing fitted with a tubular inlet member at one end and a tubular outlet exhaust member at the opposite end;
    b) a ball float valve and gravity drain means attached to said tubular housing for discharging accumulations of liquids.

3. The surge suppressor for a gas buster exhaust system according to claim 2 wherein said inlet member and said outlet exhaust members further comprise a means for coupling to said gas buster discharge stack and and to an additional surge suppressor.

4. The surge suppressor for a gas buster exhaust system according to claim 2 wherein said baffling is comprised of a baffle plate having a plurality of holes therein attached perpendicular to an end of said tubular inlet member.

5. The surge suppressor for a gas buster exhaust system according to claim 4 wherein said tubular inlet member has a plurality of peripheral holes located adjacent to said baffle plate.

6. The surge suppressor for a gas buster exhaust system according to claim 4 wherein said elongated tubular housing is divided into an upper gas chamber and a lower liquid chamber by said baffle plate.

7. The surge suppressor for a gas buster exhaust system according to claim 2 wherein said ball float valve is located within said housing adjacent said inlet port member in a manner wherein said ball is displaced as a result of fluid accumulation within said housing thus allowing said fluid to be discharged through said drain means.

8. The surge suppressor for a gas buster exhaust system according to claim 1 wherein said surge suppressor further comprises an intermediate exhaust stack for connecting a plurality of surege suppressor apparatus one to another.

9. A method for capturing fluids expelled with waste gas emitted from a well comprising the steps of:
    a) passing processing fluids containing entrained gas discharged from a well to a gas buster system for liberations of said gas;
    b) attaching an external surge suppressor to an exhaust stack of said gas buster exhausting said gas from said gas buster system through said external surge suppressor having liquid/gas separation capability; and
    c) collecting residual fluids within said external surge suppressor while discharging said gas to atmosphere.

10. The method according to claim 9 wherein said method further includes the step of recovering said fluids collected within said external surge suppressor by displacing a ball valve and thus allowing said fluids to be discharged to a recovery tank.

11. The method according to claim 9 wherein said method further includes the step of passing said waste gas discharged from said gas buster through a plurality of external surge suppressors before being released into the environment.

* * * * *